United States Patent [19]

Hamprecht et al.

[11] 4,424,156
[45] Jan. 3, 1984

[54] HALO-SUBSTITUTED AMINO-AND SUBSTITUTED-SULPHONAMIDO-CONTAINING AZO DYESTUFFS

[75] Inventors: Rainer Hamprecht, Cologne; Klaus Leverenz, Leverkusen, both of Fed. Rep. of Germany

[73] Assignee: Bayer Aktiengesellschaft, Leverkusen, Fed. Rep. of Germany

[21] Appl. No.: 185,660

[22] Filed: Sep. 10, 1980

[30] Foreign Application Priority Data

Sep. 25, 1979 [DE] Fed. Rep. of Germany ....... 2938633

[51] Int. Cl.³ .................. C09B 29/036; C09B 29/039; C09B 29/085; C09B 29/09
[52] U.S. Cl. .................................. 260/205; 260/152; 260/157; 260/158; 260/163; 260/207; 260/207.1; 564/99
[58] Field of Search ............ 260/205, 206, 207, 207.1, 260/207.3, 207.5

[56] References Cited

U.S. PATENT DOCUMENTS

| | | | |
|---|---|---|---|
| 2,264,303 | 12/1941 | Dickey | 260/205 |
| 2,359,305 | 10/1944 | Dickey et al. | 260/205 |
| 2,386,599 | 10/1945 | Dickey et al. | 260/205 X |
| 2,955,901 | 10/1960 | Kruckenberg | 260/205 X |
| 3,079,377 | 2/1963 | Sartori | 260/205 |
| 3,081,295 | 3/1963 | Sterling | 260/205 |
| 3,398,135 | 8/1968 | Mueller | 260/205 |
| 3,445,454 | 5/1969 | Fishwick et al. | 260/205 |
| 3,951,591 | 4/1976 | Birke et al. | 260/205 X |
| 3,978,040 | 8/1976 | Gottschlich et al. | 260/205 |
| 4,115,381 | 9/1978 | Ramanathan | 260/205 |
| 4,152,114 | 5/1979 | Koller et al. | 260/205 X |

FOREIGN PATENT DOCUMENTS

| | | | |
|---|---|---|---|
| 1963009 | 6/1971 | Fed. Rep. of Germany | 260/205 |
| 2137500 | 6/1973 | Fed. Rep. of Germany | 260/205 |
| 2031927 | 9/1978 | United Kingdom | 260/205 |
| 1559562 | 1/1980 | United Kingdom | 260/205 |

*Primary Examiner*—Floyd D. Higel
*Attorney, Agent, or Firm*—Sprung, Horn, Kramer & Woods

[57] ABSTRACT

An azo dyestuff suited for dyeing polyester, of the formula

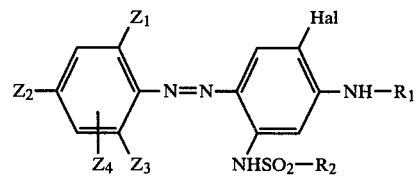

in which
Hal is F, Cl, Br or I,
$R_1$ is a $C_1$-$C_{10}$-aliphatic hydrocarbyl or a $C_5$-$C_8$-cycloalkyl radical optionally substituted by OH, halogen, alkoxy, aryloxy or acyloxy,
$R_2$ is an optionally substituted aliphatic hydrocarbyl, aryl or hetaryl radical,
$R_1$ and $R_2$ being free from —SO$_3$H and/or —COOH radicals,
$Z_1$ to $Z_4$ each independently is hydrogen, alkyl, cycloalkyl, aralkyl, halogen, —CN, —NO$_2$, —CF$_3$, —SO$_2$Q, —SO$_2$NVW, —COW, —CONVW, —CO$_2$W, —OQ, —NVW, —NWCOW, —NWSO$_2$Q or —NHCO$_2$Q, or
$Z_2$ may also be arylazo, and
$Z_3$ may also be

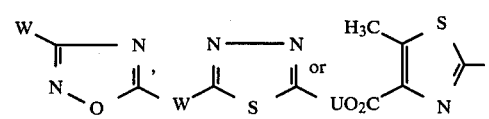

and
$Z_3$ and $Z_4$ together can be

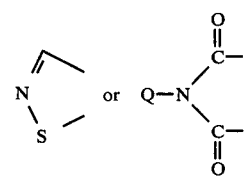

Q is alkyl, aralykl or aryl,
U is alkyl,
V is H, alkyl or aralkyl, and
W is V or aryl.

4 Claims, No Drawings

HALO-SUBSTITUTED AMINO-AND SUBSTITUTED-SULPHONAMIDO-CONTAINING AZO DYESTUFFS

The invention relates to disperse azo dyestuffs of the formula

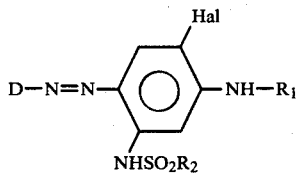
(I)

wherein
- D denotes the radical of a diazo component of the thiophene, thiazole, isothiazole, isothiazolothiophene, benzthiazole, benzisothiazole, 3-aryl-1,2,4-thiadiazole, 1,3,4-thiadiazole, pyrazole, imidazole, triazole or indazole series or, preferably, of the benzene series,
- Hal denotes F, Cl, Br or I,
- $R_1$ denotes a saturated or unsaturated $C_1$–$C_{10}$-alkyl or $C_5$–$C_8$-cycloalkyl radical which can be substituted by OH, halogen, alkoxy, aryloxy or acyloxy and
- $R_2$ denotes an optionally substituted and optionally unsaturated alkyl radical or an optionally substituted aryl or hetaryl radical, the radicals mentioned being free from groups conferring solubility in water (—$SO_3H$ or —$CO_2H$).

Preferred radicals of heterocyclic diazo components are

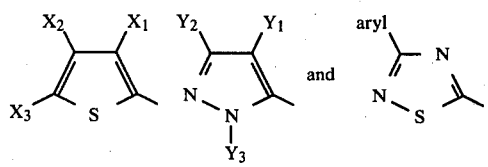

wherein
- $X_1$ denotes H, —$NO_2$, —CN, Cl, Br, alkyl, aryl, alkylcarbonyl, alkoxycarbonyl, arylcarbonyl, aryloxycarbonyl, —$SO_2$-alkyl, —$SO_2$-aryl,

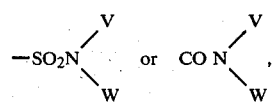

- $X_2$ denotes H, alkyl, aryl, $NO_2$, halogen, alkoxy, alkylcarbonyl, arylcarbonyl or aryloxy, and
- $X_3$ denotes H, —$NO_2$, —CN, Cl, Br, alkyl, aryl, alkoxycarbonyl, alkylcarbonyl, arylcarbonyl, —SCN, alkylsulphonyl, arylsulphonyl,

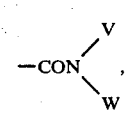

—CHO or arylazo, or
$X_2$ and $X_3$ together denote the radical —$(CH_2)_3$—, —$(CH_2)_4$— or —CH=CH—CH=CH—, $Y_1$ denotes H, alkyl, CN, alkoxycarbonyl, $CF_3$, $NO_2$ or

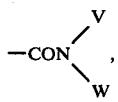

$Y_2$ denotes H, alkyl, CN, alkylmercapto or alkoxycarbonyl,
$Y_3$ denotes H, alkyl, aryl, —CO-alkyl, —CO-aryl, —$SO_2$-alkyl or —$SO_2$-aryl,
V denotes H, alkyl or aralkyl and
W denotes V or aryl.

Preferred radicals of benzene diazo components are those of the formula

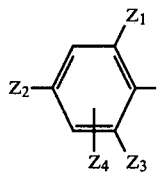

wherein
- $Z_1$–$Z_4$ denote hydrogen, alkyl, cycloalkyl, aralkyl, halogen, —CN, —$NO_2$, —$CF_3$, —$SO_2Q$, —$SO_2NVW$, —COW, —CONVW, —$CO_2W$, —OQ, —NVW, —NWCOW, —$NWSO_2Q$ or —$NHCO_2Q$, and
- $Z_2$ also denotes arylazo,
- $Z_3$ also denotes

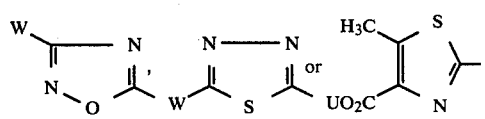

and
$Z_3$ and $Z_4$ together can form the remaining members of a fused-on heterocyclic ring, such as

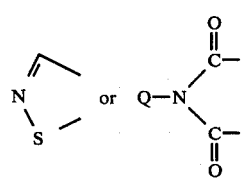

wherein
- Q denotes alkyl, aralkyl or aryl,
- U denotes alkyl, and
- the remaining radicals V and W have the abovementioned meaning.

Unless defined otherwise, suitable alkyl radicals are $C_1$–$C_{10}$-alkyl radicals, preferably $C_1$–$C_4$-alkyl radicals, which can be substituted, inter alia, by halogen, CN, alkoxy and OH.

Alkyl is preferably methyl, ethyl, n-propyl, n-butyl, n-pentyl or n-hexyl.

Unsaturated alkyl is $C_2$–$C_{10}$-alkenyl, in particular $C_3$–$C_5$-alkenyl, which can optionally be substituted by halogen.

Halogen is preferably Br or, in particular, Cl.

Suitable alkoxy radicals are $C_1$–$C_4$-alkoxy radicals.

Suitable aralkyl radicals are phenyl-$C_1$-$C_4$-alkyl radicals.

Suitable aryl radicals are naphthyl and, in particular, phenyl, which can be mono- to tetra-substituted by halogen, alkoxy or alkyl or mono- or di-substituted by $NO_2$, CN, $SO_2Q$, $SO_2NVW$, COW, $CO_2Q$, aryl, aryloxy, NVW or arylazo.

Suitable hetaryl radicals are thienyl and pyridyl.

Suitable acyl radicals are the radicals of aliphatic ($C_1$-$C_4$) or aromatic carboxylic acids, the carboxylic acid ester radical —$CO_2Q$ and the carbamoyl radical —CONHQ.

Preferred dyestuffs are those of the formula I wherein D represents

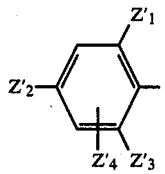

Hal represents Cl or Br, $R_1$ represents saturated n-$C_1$-$C_8$-alkyl, which can be substituted by Cl or $C_1$-$C_4$-alkoxy, and $R_2$ represents saturated n-$C_1$-$C_6$-alkyl, which can be substituted by Cl, or phenyl, which can be mono- or di-substituted by Cl or $C_1$-$C_4$-alkyl, and wherein $Z_1'$ denotes H, —$NO_2$, —CN, —Cl, —Br, —$SO_2$—$C_1$-$C_4$-alkyl, $CF_3$ or —$CO_2$—$C_1$-$C_4$-alkyl, $Z_2'$ denotes $Z_1'$, $C_1$-$C_4$-alkyl or phenylazo, $Z_3'$ denotes $Z_1'$ or H and $Z_4'$ denotes H, $C_1$-$C_2$-alkyl or Cl.

Particularly preferred dyestuffs correspond to the formulae II and III

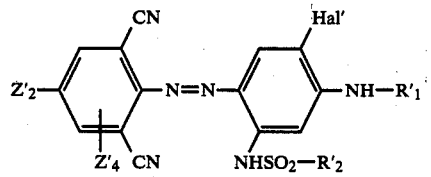

and

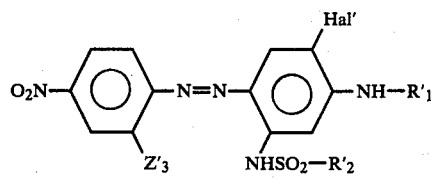

wherein $R_1'$ denotes $C_1$-$C_6$-alkyl, $C_1$-$C_6$-chloroalkyl or $C_1$-$C_4$-alkoxy-($C_1$-$C_4$)-alkyl, $R_2'$ denotes $C_1$-$C_4$-alkyl, $C_1$-$C_4$-chloroalkyl, phenyl, tolyl, xylyl, chlorophenyl or dichlorophenyl, Hal' denotes Cl or Br, $Z_2'$ denotes H, methyl, ethyl, Cl, Br or $CF_3$, $Z_3'$ denotes H, Cl, Br, $NO_2$, CN, —$SO_2$—$C_1$-$C_4$-alkyl, $CF_3$ or —$CO_2$—($C_1$-$C_4$)-alkyl and $Z_4'$ denotes H, methyl or Cl.

Very particularly preferred dyestuffs are those of the formulae II and III wherein $R_1'$ denotes $C_3$-$C_6$-alkyl and $R_2'$, Hal' and $Z_2'$-$Z_4'$ have the abovementioned meaning.

To prepare the dyestuffs of the formula I, for example, aromatic amines of the formula $$D-NH_2 \qquad\qquad IV$$

are diazotised and the diazotisation products are coupled with compounds of the formula

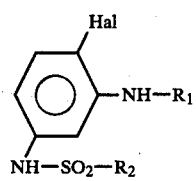

The diazotisation and coupling are carried out by customary processes known in dyestuff chemistry (compare, for example, German Offenlegungsschrift No. 2,632,203).

To prepare dyestuffs of the formula I which carry one or two cyano groups in the o-positions of the diazo components, diazotised anilines of the formula

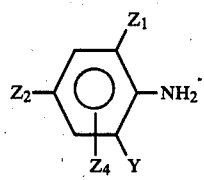

wherein $Z_1$-$Z_4$ have the meaning described above and

Y denotes Cl, Br or I, are first preferably coupled to coupling components of the formula V to prepare the corresponding o-halogenoazo dyestuffs

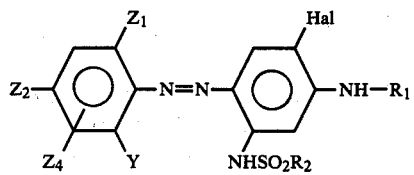

and these dyestuffs are converted, by a nucleophilic replacement reaction with cyanides to replace one, or, in the case of o,o-dihalogenoazo dyestuffs, two halogen atoms, into the dyestuffs of the formula VII wherein Y and, in the case of two replacements, also $Z_1$ denote cyano and $Z_1$, $Z_2$, $Z_4$, Hal, $R_1$ and $R_2$ otherwise have the abovementioned meaning.

These processes are also generally known, compare, for example, U.S. Pat. No. 3,627,752, U.S. Pat. No. 3,772,268, U.S. Pat. No. 3,821,195, U.S. Pat. No. 3,876,621, U.S. Pat. No. 3,978,040, U.S. Pat. No. 4,045,430 and British Pat. No. 1,184,825, and are also applicable to heterocyclic azo dyestuffs, for example for the preparation of o-cyano-pyrazolyl-azo dyestuffs according to German Offenlegungsschrift No. 2,727,268.

Cyanides which are preferably to be employed are CuCN, if appropriate as a mixture with zinc cyanides, and complex Cu-I cyanides. One or two nitro groups or sulphone groups can also be introduced into dyestuffs of the formula VII wherein $Z_1$–$Z_4$, Hal, $R_1$ and $R_2$ have the abovementioned meaning and Y denotes Cl, Br or I by replacement of one or two halogen atoms by nitrite or by sulphinate, Y and, if appropriate, $Z_1$ being replaced.

The diazo components are also generally known (compare, for example, Belgian Patent No. 643,774 and Belgian Patent No. 660,461).

Examples of suitable diazo components are 2-chloro-4-nitro-aniline, 2-cyano-4-nitro-aniline, 2,4-dinitro-aniline, 2,4-dicyano-aniline, 4-nitro-aniline, 2-nitro-aniline, 2-amino-5-nitro-benzoic acid methyl ester, 2,6-dibromo-4-methyl-aniline, 2,6-dibromo-4-methoxy-aniline, 2,4,6-tribromo-aniline, 2,4,6-trichloroaniline, 2,6-dibromo-4-trifluoromethylaniline, 2-trifluoromethyl-4-nitro-aniline, 2-bromo-4-nitro-aniline, 2,6-dibromo-4-nitro-aniline, 2,6-dibromo-4-phenylazoaniline, 2-bromo-4,6-dinitro-aniline, 2-chloro-4,6-dinitro-aniline, 2-methylsulphonyl-4-nitro-aniline, 2-methylsulphonyl-4-nitro-6-bromo-aniline, 2-cyano-4,6-dinitro-aniline, 2,4-bis-methylsulphonyl-aniline, 2-chloro-4-nitro-6-cyano-aniline, 2-chloro-4-methylsulphonyl-aniline, 3-phenyl-5-amino-1,2,4-thiadiazole, 3-amino-5-nitro-2,1-benzisothiazole, 2-amino-5-nitrothiazole, 2-amino-5-phenyl-1,3,4-thiadiazole, 2-amino-5-ethylmercapto-1,3,4-thiadiazole, 1-phenyl-3-methyl-4-cyano-5-aminopyrazole, 2-amino-benzthiazole, 2-amino-6-nitro-benzthiazole, 2-amino-3-nitro-5-methylsulphonylthiophene, 2-amino-3,5-dinitro-thiophene and 2-amino-3-cyano-5-nitro-thiophene.

The preparation of the coupling components has not yet been described in the literature. These are obtained, for example, by converting halogeno-m-phenylene-diamines of the formula VIII into the sulphonamides IX with sulphochlorides $R_2SO_2Cl$ in protic or aprotic solvents, preferably in the neutral to acid range (pH=3–7) and then reacting the sulphonamides with the alkylating agents $R_1$—X wherein X denotes Cl, Br, I, $OSO_3$-alkyl, $OSO_2$alkyl, $OSO_2$-aryl or $OP(Oalkyl)_2$ in an aqueous or organic medium, preferably in the acid range (pH=3–6.5), to give the coupling components V.

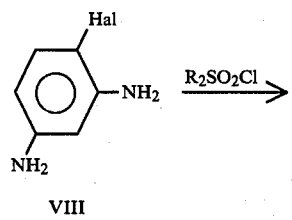

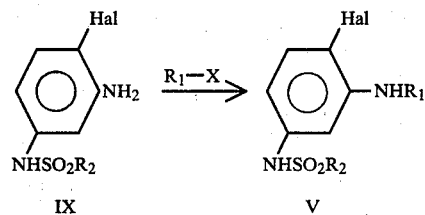

In the case where the coupling component V contains a β-hydroxyl group in $R_1$, epoxides, such as, for example, ethylene oxide, propylene oxide, epichlorohydrin, glycidol, butylene 1,2-oxide or butylene 1,3-oxide, are appropriately used for the alkylation of VIII. This oxy-alkylation is also preferably carried out in the acid range.

Reductive alkylation of IX with carbonyl compounds in the presence of hydrogenation catalysts, such as, for example, Raney nickel or platinum on active charcoal, provides a further possibility for the preparation of the coupling components V. Cyclopentyl, cyclohexyl or 2-ethyl-hexyl radicals in particular can be readily introduced in this manner.

Furthermore, it is also possible to employ intermediate products of the formula

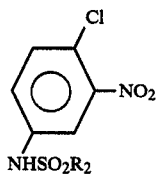

for the reductive alkylation with carbonyl compounds.

Examples of suitable coupling components are 1-chloro-2-propylamino-4-methane-sulphonamido-benzene, 1-chloro-2-n-butylamino-4-methane-sulphonamido-benzene, 1-chloro-2-n-pentylamino-4-methane-sulphonamido-benzene, 1-chloro-2-n-hexylamino-4-methane-sulphonamido-benzene, 1-chloro-2-n-octylamino-4-methane-sulphonamido-benzene, 1-chloro-2-n-hexylamino-4-tosylamido-benzene, 1-chloro-2-n-pentylamino-4-butanesulphonamido-benzene, 1-chloro-2-n-butylamino-4-vinylsulphonamido-benzene, 1-chloro-2-n-butylamino-4-chloromethanesulphonamido-benzene, 1-bromo-2-n-butylamino-4-methanesulphonamido-benzene, 1-iodo-2-n-pentylamino-4-methanesulphonamido-benzene, 1-chloro-2-n-butylamino-4-(4'-chloro)-benzenesulphonamido-benzene, 1-chloro-2-ethoxy-ethylamino-4-methanesulphonamido-benzene, 1-chloro-2-(3'-chloro-but-2'-enyl)-amino-4-methanesulphonamido-benzene and 1-chloro-2-(4'-chlorobutyl)-amino-4-methanesulphonamido-benzene.

The new dyestuffs are distinguished by a good affinity and are therefore outstandingly suitable for dyeing and printing synthetic fibres, in particular cellulose ester fibres, high molecular weight polyamide fibres and, above all, polyester fibres, on which they produce dyeings with good fastness properties and a particularly clear colour shade.

EXAMPLE 1

Preparation of the dyestuff of the formula

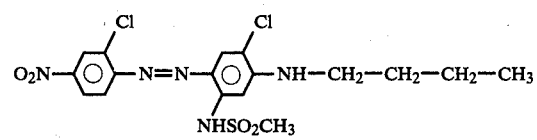

5 g of 2-chloro-4-nitroaniline are dissolved in 40 ml of glacial acetic acid and 20 ml of propionic acid, and 6.2 ml of nitrosylsulphuric acid (40 percent strength solution in sulphuric acid) are added at 0°–5° C. in the course of 30 minutes. The diazotisation mixture is subsequently stirred at 5° C. for one hour and then poured onto an ice-cold solution of 8.5 g of 1-chloro-2-(n-butylamino)-4-methanesulphonamido-benzene in 100 ml of glacial acetic acid and 20 ml of 10 percent strength amidosulphonic acid solution. After adding 100 ml of ice-water, the pH is adjusted to 2 with sodium acetate and the product is then filtered off, washed with water and dried. Yield: 12.4 g.

The mass spectrum shows peaks at 459 (56.9%) and 461 (46.7%). $\lambda_{max}=500$ nm.

The dyestuff dyes polyester in a clear scarlet shade with good fastness properties, in particular fastness to light, sublimation and wet processing.

The dyestuffs given in the following table are obtained by an analogous or similar procedure.

| Example No. | Formula | Colour shade on polyester | $\lambda_{max}$ [nm] |
|---|---|---|---|
| 2 | $O_2N$–⟨⟩(CN)–N=N–⟨⟩(Cl, NHSO_2CH_3)–NH–(CH_2)_4–CH_3 | bluish-tinged red | 522 |
| 3 | $O_2N$–⟨⟩(CO_2CH_3)–N=N–⟨⟩(Cl, NHSO_2CH_3)–NH–(CH_2)_5CH_3 | reddish-tinged orange | 466 |
| 4 | $O_2N$–⟨⟩(CF_3)–N=N–⟨⟩(Cl, NHSO_2CH_3)–NH(CH_2)_3–CH_3 | scarlet | 510 |
| 5 | $O_2N$–⟨⟩(NO_2)–N=N–⟨⟩(Cl, NHSO_2CH_3)–NH–CH_2–CH(C_2H_5)–C_4H_9 | red | 510 |
| 6 | $O_2N$–⟨⟩(Cl)–N=N–⟨⟩(Cl, NHSO_2–⟨⟩)–NH–(CH_2)_5CH_3 | scarlet | 500 |
| 7 | $O_2N$–⟨⟩(CN)–N=N–⟨⟩(Cl, NHSO_2–⟨⟩–CH_3)–NH–(CH_2)_3–CH_3 | bluish-tinged red | 522 |
| 8 | $O_2N$–⟨⟩(Cl)–N=N–⟨⟩(Cl, NHSO_2CH_3)–NH–CH_2–CH(OH)–C_2H_5 | scarlet | 500 |

-continued
| Example No. | Formula | Colour shade on polyester | $\lambda_{max}$ [nm] |
|---|---|---|---|
| 9 | 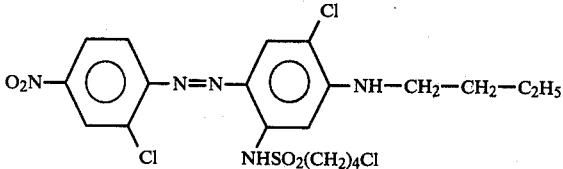 | scarlet | 500 |
| 10 | 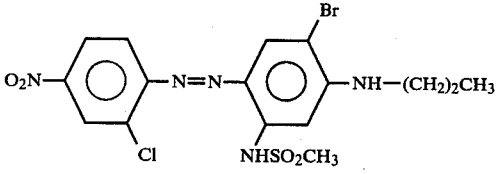 | scarlet | 500 |
| 11 | 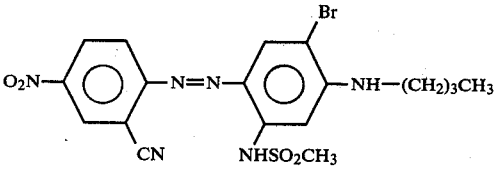 | bluish-tinged red | 522 |
| 12 | 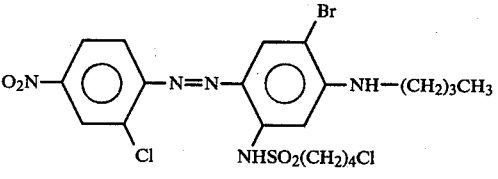 | scarlet | 500 |
| 13 | 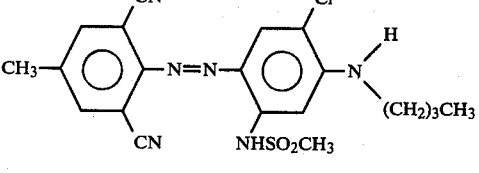 | scarlet | 500 |
| 14 | 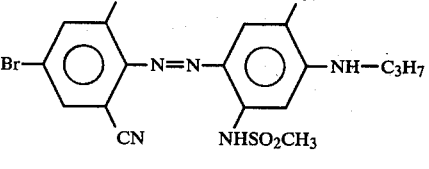 | red | 520 |
| 15 | 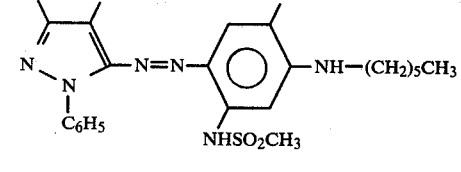 | scarlet | 508 |
| 16 | 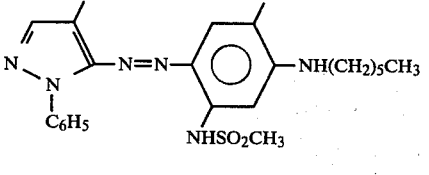 | scarlet | 508 |

-continued

| Example No. | Formula | Colour shade on polyester | $\lambda_{max}$ [nm] |
|---|---|---|---|
| 17 | (structure: 3,5-dinitrothiophene azo - 2-chloro-4-(NH-C3H7)-5-NHSO2CH3 phenyl) | blue | 615 |
| 18a | (structure: 3-nitro-5-cyano-thiophene azo - 2-chloro-4-(NH-(CH2)3CH3)-5-NHSO2CH3 phenyl) | blue | 615 |
| 18b | (structure: 3-phenyl-1,2,4-thiadiazole azo - 2-chloro-4-(NH-(CH2)5CH3)-5-NHSO2CH3 phenyl) | scarlet | 510 |
| 19a | (structure: 2,6-dicyano-4-chlorophenyl azo - 2-chloro-4-NHC2H5-5-NHSO2CH3 phenyl) | red | 520 |
| 19b | (structure: 2,6-dicyano-4-chlorophenyl azo - 2-chloro-4-NHCH2CH2CH3-5-NHSO2CH3 phenyl) | red | 520 |

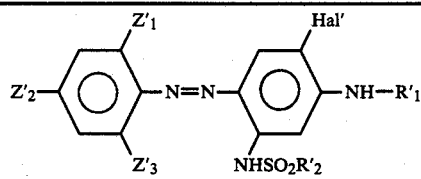

| Example No. | $Z'_1$ | $Z'_2$ | $Z'_3$ | Hal' | $R'_1$ | $R'_2$ | Colour shade on polyester |
|---|---|---|---|---|---|---|---|
| 20 | H | NO2 | Cl | Cl | C2H5 | CH3 | scarlet |
| 21 | H | NO2 | Cl | Cl | n-C3H7 | CH3 | scarlet |
| 22 | H | NO2 | Cl | Cl | n-C5H11 | CH3 | scarlet |
| 23 | H | NO2 | Cl | Cl | n-C8H17 | CH3 | scarlet |
| 24 | H | NO2 | Cl | Cl | n-C3H7 | —C6H4—CH3 | scarlet |
| 25 | H | NO2 | Br | Cl | n-C4H7 | —C6H4—CH3 | scarlet |
| 26 | H | NO2 | Br | Br | n-C4H7 | —C6H4—CH3 | scarlet |
| 27 | H | NO2 | CN | Cl | n-C3H7 | CH3 | bluish-tinged red |
| 28 | H | NO2 | CN | Cl | n-C3H7 | C2H5 | bluish-tinged red |
| 29 | H | NO2 | CN | Cl | n-C5H11 | —CH=CH2 | bluish-tinged red |
| 30 | H | NO2 | SO2CH3 | Cl | n-C5H11 | CH3 | bluish-tinged red |

-continued

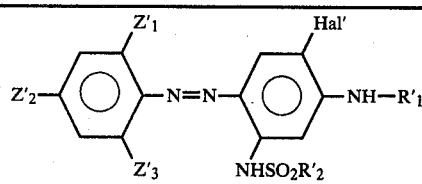

| Example No. | $Z'_1$ | $Z'_2$ | $Z'_3$ | Hal' | $R'_1$ | $R'_2$ | Colour shade on polyester |
|---|---|---|---|---|---|---|---|
| 31 | Cl | $NO_2$ | Cl | Cl | $n\text{-}C_4H_9$ | $CH_3$ | yellow-brown |
| 32 | Br | $NO_2$ | Br | Cl | $n\text{-}C_4H_9$ | $n\text{-}C_4H_9$ | yellow brown |
| 33 | Br | $CH_3$ | Br | " | $n\text{-}C_3H_7$ | $CH_3$ | yellow |
| 34 | Br | Br | Br | Cl | $n\text{-}C_3H_7$ | $CH_3$ | yellow |
| 35 | H | $CH_3SO_2$ | Cl | Cl | $n\text{-}C_3H_7$ | $CH_3$ | orange |
| 36 | H | $CH_3SO_2$ | Br | Cl | $n\text{-}C_4H_9$ | —⟨O⟩ | orange |
| 37 | CN | $NO_2$ | Br | Cl | $n\text{-}C_5H_{11}$ | $CH_3$ | violet |
| 38 | CN | $NO_2$ | CN | Cl | $n\text{-}C_4H_9$ | $CH_3$ | reddish-tinged blue |
| 39 | CN | $NO_2$ | $NO_2$ | Cl | $n\text{-}C_4H_9$ | $CH_3$ | reddish-tinged blue |
| 40 | H | $NO_2$ | $NO_2$ | Cl | $C_2H_3OCH_3$ | $CH_3$ | red |
| 41 | H | $NO_2$ | Cl | Cl | $C_2H_4OC_2H_5$ | $CH_3$ | scarlet |
| 42 | H | $NO_2$ | Cl | Cl | $-CH_2-CH=CH_2$ | $CH_3$ | scarlet |
| 43 | H | $NO_2$ | Cl | Cl | $-(CH_2)_4Cl$ | $CH_3$ | scarlet |
| 44 | H | $NO_2$ | Cl | Cl | $C_2H_4COCH_3$ | $C_2H_5$ | scarlet |
| 45 | H | $NO_2$ | Cl | Cl | $C_2H_4OCOC_2H_5$ | $CH_3$ | scarlet |
| 46 | H | $NO_2$ | CN | Cl | $C_2H_4OC_2H_5$ | $CH_3$ | bluish-tinged red |
| 47 | H | $NO_2$ | CN | Cl | $-(CH_2)_4Cl$ | $CH_3$ | bluish-tinged red |
| 48 | H | $NO_2$ | CN | F | $n\text{-}C_3H_7$ | $CH_3$ | bluish-tinged red |
| 49 | H | $NO_2$ | Cl | F | $n\text{-}C_3H_7$ | $CH_3$ | scarlet |
| 50 | CN | $CF_3$ | CN | Cl | $n\text{-}C_3H_7$ | $CH_3$ | red |
| 51 | CN | $C_6H_{11}$ | CN | Cl | $n\text{-}C_3H_7$ | $CH_3$ | scarlet |
| 52 | CN | $CH_3$ | CN | Cl | $C_6H_{11}$ | $CH_3$ | scarlet |
| 53 | H | $NO_2$ | Cl | Cl | $C_6H_{11}$ | $CH_3$ | scarlet |
| 54 | H | $NO_2$ | Br | Cl | $C_6H_{11}$ | $CH_3$ | scarlet |
| 55 | H | $NO_2$ | CN | Cl | $C_6H_{11}$ | $CH_3$ | bluish-tinged red |
| 56 | H | $NO_2$ | Cl | Cl | $C_2H_4OCONHC_4H_9$ | $CH_3$ | scarlet |
| 57 | H | $NO_2$ | Cl | Cl | $C_2H_4OCONHC_6H_5$ | $CH_3$ | scarlet |

EXAMPLE 58

Preparation of 1-chloro-2-amino-4-methanesulphonamidobenzene (a) 32.5 g of whiting and 35.8 g of 4-chloro-1,3-diaminobenzene are suspended in 500 ml of water. The suspension is brought to 0° C. by adding dry ice and by cooling with ice and is adjusted to pH 5.3. An ice-cold solution of 23 ml of methanesulphonyl chloride in 125 ml of methanol is added dropwise at 0° C. in the course of 3-4 hours. The mixture is subsequently stirred at room temperature for about a further 2 hours before being further processed according to Example 59.

(b) 28.64 g of 4-chloro-1,3-diaminobenzene and 13 g of whiting are dispersed in 100 ml of water and 100 ml of ethyl acetate at room temperature. 17 ml of methanesulphonyl chloride are added dropwise in the course of 4 hours, whilst stirring. The mixture is stirred at room temperature for a further 12 hours, the solvent is distilled off, the mixture which remains is rendered acid to Congo Red with dilute sulphuric acid, the gypsum which has formed is filtered off and the reaction product is precipitated from the filtrate by adding sodium hydroxide solution. The 1-chloro-2-amino-4-methanesulphonamide obtained is sufficiently pure for further reactions according to Example 59.

(c) 35.8 g of 4-chloro-1,3-diaminobenzene are stirred thoroughly into 250 ml of water and 50 ml of methanol. 23 ml of methanesulphonyl chloride are added dropwise at 0° C. in the course of about 2 hours; the pH is kept at 4 by dropwise addition of concentrated sodium hydroxide solution. The mixture is subsequently stirred at room temperature for about 2 hours and, if appropriate after diluting with water, the 1-chloro-2-amino-4-methanesulphonamido-benzene which has separated out is then filtered off. It is sufficiently pure for further reactions according to Example 59.

EXAMPLE 59

Preparation of 1-chloro-2-butylamino-4-methanesulphonamido-benzene

The reaction mixture obtained according to Example 58 a is saturated with carbon dioxide at 0° C., 50 g of whiting and 107 ml of n-butyl bromide are added and the mixture is heated to 130° C. in an autoclave for 30 hours. After letting down and cooling, the mixture is extracted several times with methylene chloride. The extracts are dried over sodium sulphate and concentrated in vacuo. Yield: 64.2 g.

The mass spectrum shows molecular peaks at 276 and 278 with intensities of 29.49% and 11.31%.

It is, of course, also possible to use other customary acid acceptors instead of whiting.

The other coupling components of the formula V which have not yet been described can be prepared analogously.

We claim:

1. An azo dyestuff of the formula

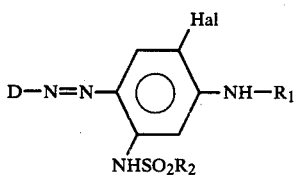

wherein D denotes the radical of a diazo component of the formula

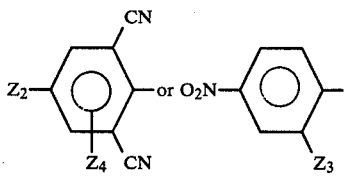

wherein
 $R_1$ denotes $C_1$-$C_6$-alkyl, $C_1$-$C_6$-chloroalkyl or $C_1$-$C_4$-alkoxy-($C_1$-$C_4$)-alkyl,
 $R_2$ denotes $C_1$-$C_4$-alkyl, $C_1$-$C_4$-chloroalkyl, phenyl, tolyl, xylyl, chlorophenyl, or dichlorophenyl,
 Hal denotes Cl or Br, $Z_2$ denotes H, methyl, ethyl, Cl, Br or $CF_3$
$Z_3$ denotes H, Cl, Br, $NO_2$, CN, $CF_3$, —$CO_2$—($C_1$-$C_4$)-alkyl or —$SO_2$—($C_1$-$C_4$)-alkyl, and
$Z_4$ denotes H, methyl or Cl.

2. An azo dyestuff according to claim 1, in which D is

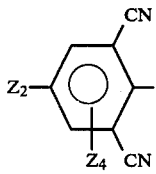

3. An azo dyestuff according to claim 1, in which D is

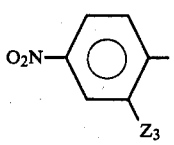

4. An azo dyestuff according to claim 2 or 3 in which $R_1$ is $C_3$-$C_6$-alkyl.

* * * * *